(12) United States Patent
Paradise et al.

(10) Patent No.: US 10,962,128 B2
(45) Date of Patent: Mar. 30, 2021

(54) FIRE ACTIVATED COOLING FLUID VALVE

(71) Applicant: Hamilton Sundstrand Corporation, Charlotte, NC (US)

(72) Inventors: Bruce D. Paradise, West Hartford, CT (US); Kofi Owusu, Manchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 257 days.

(21) Appl. No.: 16/171,518

(22) Filed: Oct. 26, 2018

(65) Prior Publication Data

US 2020/0132206 A1 Apr. 30, 2020

(51) Int. Cl.

| F16K 17/38 | (2006.01) |
|---|---|
| F01D 21/12 | (2006.01) |
| F02C 7/232 | (2006.01) |
| F02C 9/28 | (2006.01) |
| F16K 31/00 | (2006.01) |

(Continued)

(52) U.S. Cl.
CPC .............. *F16K 17/38* (2013.01); *F01D 21/12* (2013.01); *F02C 7/232* (2013.01); *F02C 9/28* (2013.01); *F16K 31/002* (2013.01); *F23K 5/142* (2013.01); *F23K 5/147* (2013.01); *F23K 5/16* (2013.01); *F05D 2220/32* (2013.01); *F05D 2270/303* (2013.01); *F05D 2300/50212* (2013.01); *F23K 2300/201* (2020.05); *F23K 2900/05141* (2013.01)

(58) Field of Classification Search
CPC ........ F01D 21/12; F16K 17/38; F16K 31/002; F23K 5/16; F23K 2900/05141
See application file for complete search history.

(56) References Cited

U.S. PATENT DOCUMENTS

| 3,782,681 A | 1/1974 | Blackstein |
|---|---|---|
| 8,490,639 B2 * | 7/2013 | Vandrak .................. F16K 1/308 137/75 |

(Continued)

FOREIGN PATENT DOCUMENTS

GB 547127 A 8/1942

OTHER PUBLICATIONS

European Search Report for EP Application No. 19204960.9 dated Mar. 18, 2020.

*Primary Examiner* — Jonathan Bradford
(74) *Attorney, Agent, or Firm* — Carlson, Gaskey & Olds, P.C.

(57) ABSTRACT

A cooling fluid valve having an actuator portion extending outwardly beyond an outer surface of an actuator housing. The cooling fluid valve actuator portion includes a plug force fit into an orifice in a valve housing. The plug blocks flow of cooling fluid from a cooling fluid inlet to a cooling fluid outlet. The cooling fluid outlet is connected to communicate cooling fluid to the component. The plug is formed of a material having a first coefficient of thermal expansion. A portion of the valve housing includes the orifice receiving the plug being formed of a material having a second coefficient of thermal expansion with the second coefficient of thermal expansion being higher than the first coefficient of thermal expansion, such that when the actuator portion of the valve is exposed to heat, the force fit may be eliminated as the valve housing expands at greater rate than the plug.

13 Claims, 3 Drawing Sheets

(51) Int. Cl.
  *F23K 5/14*  (2006.01)
  *F23K 5/16*  (2006.01)

(56) References Cited

U.S. PATENT DOCUMENTS

| | | |
|---|---|---|
| 8,549,864 B2 | 10/2013 | Langdon, II et al. |
| 8,950,170 B2 | 2/2015 | Paradise |
| 9,617,921 B2 | 4/2017 | Biyani et al. |
| 2012/0227409 A1* | 9/2012 | Paradise ................ F01D 25/08 60/772 |
| 2018/0135531 A1 | 5/2018 | Widener et al. |

* cited by examiner

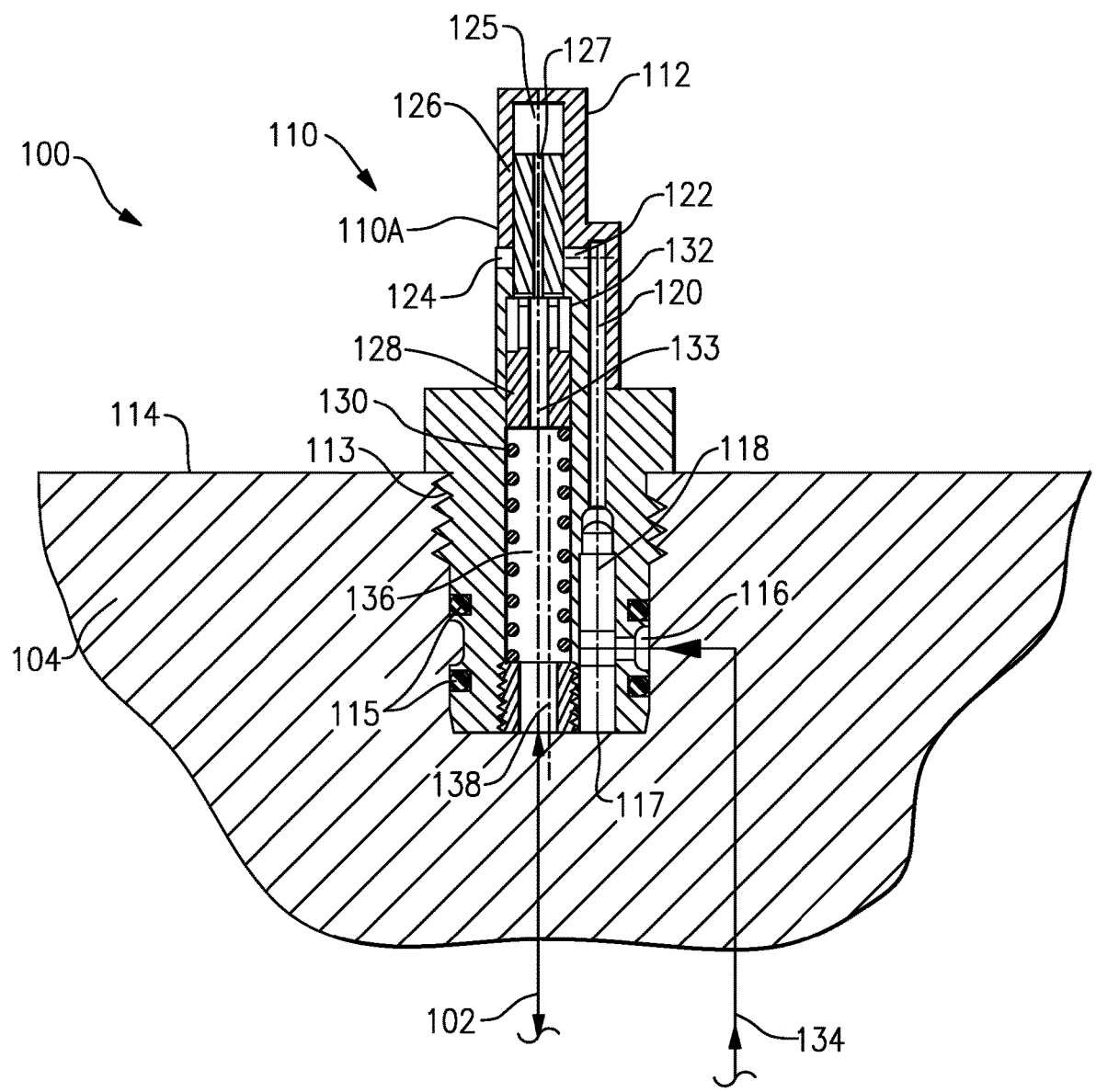
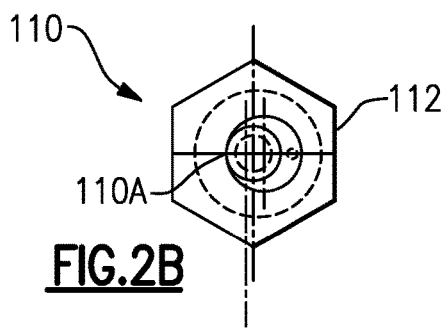 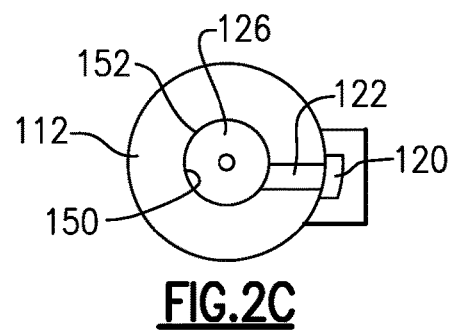
FIG.2A
FIG.2B
FIG.2C

FIRE ACTIVATED COOLING FLUID VALVE

STATEMENT REGARDING FEDERALLY SPONSORED RESEARCH OR DEVELOPMENT

This invention was made with Government support under Contract No. FA8626-16-C-2139, awarded by the United States Air Force. The Government has certain rights in this invention.

BACKGROUND

This application relates to a valve that is normally closed, but can move to an open position to allow cooling fluid flow during high heat situations, such as a fire.

Gas turbine engines are known and typically including a number of components operating together to provide propulsion to an aircraft. Among the most important design drivers is increasing the efficiency of the gas turbine engine. Thus, the various systems work together and provide as many functions as can be combined to support the overall operation.

As an example, the fuel system is not only utilized to provide fuel to a combustor, but it is also utilized to provide an actuating fluid for various actuators. In addition, the fuel is maintained at a relatively low temperature initially and, thus, can be used to cool other fluids in the engine, such as oil.

One concern with regard to a gas turbine engine is the remote possibility of a fire. If a fire should be encountered, the fuel being utilized for the various other functions cannot be exposed to the fire. Thus, it is known to provide protection to the various components such as for an actuator. In one known system, fuel is provided constantly as a cooling fluid to an actuator. The cooling fluid is not needed under almost all conditions. It generally only becomes necessary should a fire be encountered and to maintain the operability of that actuator for a period of time.

It is also known that a gas turbine engine can incorporate a number of such actuators. The combined parasitic flow of those several actuators each receiving cooling fluid constantly, results in a need for higher volume at the fuel pump.

In addition, the constant cooling heats the fuel that is then returned through a heat exchanger and to the combustor. By constantly heating this fuel as a cooling fluid, the cooling capacity at the heat exchanger is reduced.

It is known to provide a plug at the cooling fluid inlet to an actuator. The plug consists of an O-ring that melts when exposed to high temperature to selectively allow the flow of cooling fuel to the actuator. The plug has typically been mounted within the housing for the actuator and, thus, is somewhat slow to respond. In addition, once cooling fluid flow begins, the O-ring may sometimes resolidify, stopping further cooling fluid flow.

SUMMARY

A fluid supply system for supplying a cooling fluid has a component to be cooled and has a housing. The housing has an outer surface. A cooling fluid valve selectively provides cooling fluid to the component. The cooling fluid valve has an actuator portion extending outwardly beyond the outer surface of the housing. The cooling fluid valve actuator portion includes a plug force fit into an orifice in a valve housing. The plug blocks flow of cooling fluid from a cooling fluid inlet to a cooling fluid outlet. The cooling fluid outlet is connected to communicate cooling fluid to the component. The plug is formed of a material having a first coefficient of thermal expansion. A portion of the valve housing includes the orifice is formed of a material having a second coefficient of thermal expansion. The second coefficient of thermal expansion is higher than the first coefficient of thermal expansion, such that when the actuator portion of the valve is exposed to heat, the force fit may be eliminated as the valve housing expands at greater rate than the plug.

These and other features may be best understood from the following drawings and specification.

BRIEF DESCRIPTION OF THE DRAWINGS

FIG. 2A shows a valve provided by this disclosure.
FIG. 2B is a top view of the valve.
FIG. 2C is a cross-sectional view through an intermediate portion of the valve.

DETAILED DESCRIPTION

Figure 1:
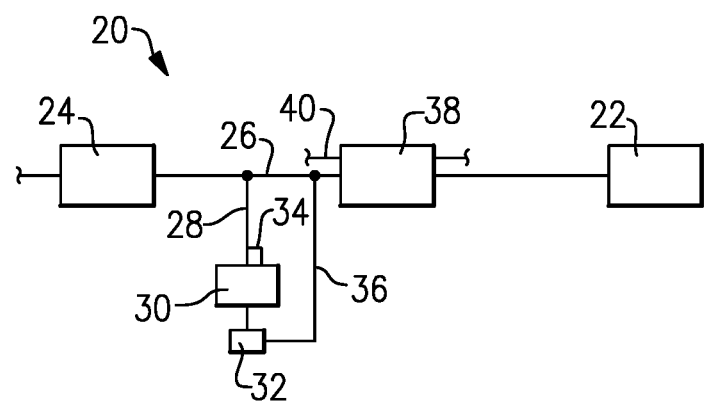
FIG. 1 schematically shows an aircraft fuel system.

An aircraft jet engine fuel supply system 20 is illustrated in FIG. 1. A combustor 22 receives fuel from a fuel pump 24. The fuel pump 24 delivers fuel into a line 26. Also, accessory fuel supply line 28 is shown for delivering fuel as a hydraulic actuating fluid to an actuator 30. Actuator 30 may actuate various components such as shown at 32. One example component 32 might be an actuator for changing an incident angle of variable vanes associated with the gas turbine engine.

A cooling fluid line 34 is also shown selectively tapped from line 28 and passing to the actuator 30. This line may be as described above in the Background of the Invention section and could be constantly supplying cooling fuel.

A return line 36 combines with the main fuel supply line 26 to pass through a heat exchanger 38. Heat exchanger 38 is shown as an oil to fuel heat exchanger, and the relatively cool fuel in the combined lines 26/36 cools the relatively hot oil in line 40. As one example, line 40 could be lubricant having cooled a gear reduction associated with a gas turbine engine although other oil applications such as from a generator, etc. are known.

In addition, it is known to have air to fuel heat exchangers also incorporated into a system 20.

As mentioned above, the constant flow of cooling fluid through line 34 has somewhat undesirable characteristics.

As such, a shut-off central valve 100 is shown in FIG. 2A. The line 34 is replaced by a line 134. The control includes a valve 110. An outlet line 102 selectively passes the fuel to the actuator if the valve 110 is actuated. Notably, in the FIG. 2A position, the valve is not actuated. A housing 104 for the actuator is shown to have an outer surface 114. The valve 110 has an actuation portion 110A that extends outwardly and, thus, as a heat transfer fin, and above the upper surface 114. Valve housing 112 has screw threads 113 received into the actuator housing 104. In addition, seals 115 are illustrated to provide a reliable fluid-tight connection.

Fuel from the cooling supply line 134 passes into an inlet 116 and through an orifice 118. Orifice 118 may be designed to provide a controlled, and limited, volume of flow. The orifice 118 may also be provided with filters and other appropriate fluid flow features. Downstream of orifice 118, a passage 120 receives the fuel. The passage 120 communicates with a fuel flow window 122. Fuel flow window 122 may be cross-drilled through the housing 110 and a plug 124 can close off a remote side. In addition, a port plug 117 may close off the passage 120 of an opposed side of the orifice 118. The plugs 117 and 124 may be welded in place.

Within the valve, a plug 126 closes off the window 122 in the unactuated position.

A chamber 125 is positioned on a remote end of the plug 126. The plug 126 has a central opening 127. A plunger 128 sits against the plug 126, and a spring 130 biases plunger 128 and, hence, plug 126 upwardly in the orientation shown in FIG. 2A. The plunger 128 has a central passage 133. A chamber 136 is downstream of the passage 133 and an outlet port 138 communicates with a line 102 to provide the cooling fluid to the actuator in the event of a fire. The term "outwardly" to refer to the valve 110 extending outwardly of the upper surface 114 can be interpreted as the inlet 116 and the outlet 138 are on one side of the upper surface 114, and the plug 126 and flow window 122 are on an opposed side of the upper surface 114.

FIG. 2B is a top view of the valve 110 and shows a hexagonal outer surface on housing 112. Actuator portion 110A is shown offset to maximize exposure of the plug to flames.

FIG. 2C shows how the valve operates. An outer periphery 152 of the plug 126 is provided in a force fit into an orifice 150 in the housing 112. As shown, in this position, the fuel window 122 is closed off by the outer surface 152 of the plug 126. The housing 112 and the plug 126 are formed of materials such that they have distinct coefficients of thermal expansion. Preferably, they have quite distinct coefficients. In one embodiment, the plug 126 may be formed of a material known as Invar. Invar has essentially no coefficient of thermal expansion. It is a nickel-iron alloy. The housing 112 could be selected to be of a material having a high coefficient of thermal expansion. As an example, the housing 112 could be formed of titanium or steel. The amount of force fit between the plug 126 and the housing 112 can be controlled to control a triggering temperature for allowing the plug 126 to move within the orifice 150.

Figure 3:
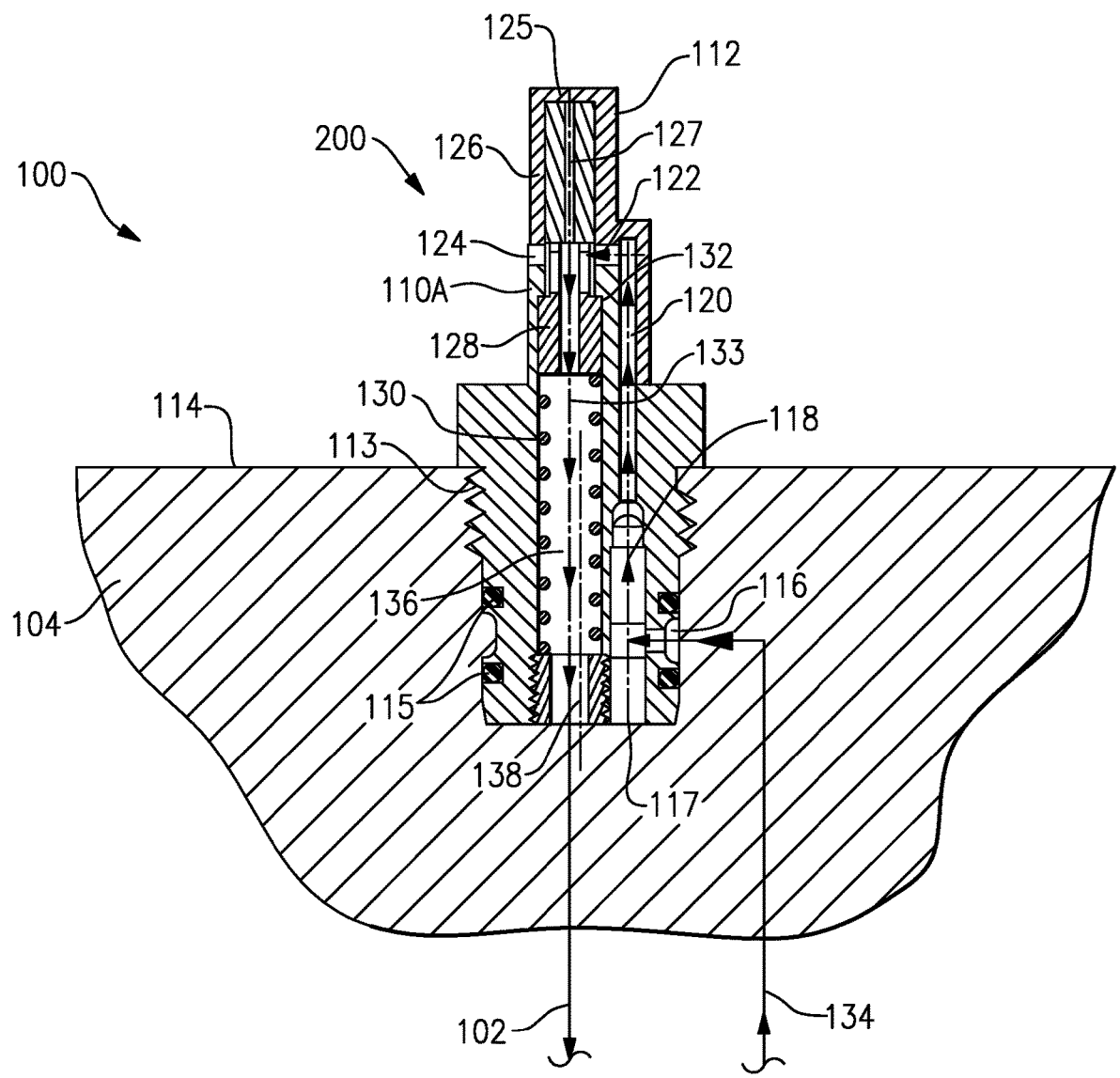
FIG. 3 shows the valve in an actuated position such as when a fire is encountered.

FIG. 3 shows the effect of a fire in a chamber 200 surrounding the central valve 100. Now, since the actuation portion 110A extends into the chamber 200, the reaction of the valve 110 to the flame is quicker than in the prior art seal plug mentioned above. The plug 126 will not expand much, but the orifice 150 will. As this expansion occurs, the spring 130 will force plunger 128 and, hence, plug 126 into the chamber 125.

One function of opening 127 is to prevent hydraulic lock for fluid which may have leaked into the chamber 125 as the plug 126 moves into the chamber.

As shown in FIG. 3, as the plug moves into the chamber 125, it no longer blocks window 122 and the fuel may flow through the window 122 openings 132 in the outer periphery of the plunger 128, the passage 134, the chamber 136, the outlet 138, and flow into line 102 to provide cooling fluid to the actuator. Once the plug has moved into the FIG. 3 position, it will remain there. It will not return to its force fit position and the spring will hold the valve in this open position until reset. If the valve is to be reset, the opening 127 can be threaded to facilitate return to the force fit position.

While Invar and titanium are disclosed, any number of other materials may be utilized which have distinct coefficients of thermal expansion. Further, while the valve is disclosed for use in a fuel supply system, it may have application in other systems utilizing a cooling flow under high heat situations.

The housing may be heated to all plug 126 to be moved into orifice 150 for assembly, or to return the valve to the unactuated position.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A system for supplying a cooling fluid comprising:
a component to be cooled, a cooling fluid valve for selectively providing cooling fluid to said component, said cooling fluid valve having an actuator portion; and
said actuator portion including a plug force fit into an orifice in a valve housing, and said plug blocking flow of cooling fluid from a cooling fluid inlet to a cooling fluid outlet, said cooling fluid outlet being connected to communicate cooling fluid to the component, there being a flow window in said valve housing for communicating cooling fluid, and said plug blocking said flow window in a force fit position and said plug being formed of a material having a first coefficient of thermal expansion, and a portion of said valve housing including said orifice receiving said plug being formed of a material having a second coefficient of thermal expansion with said second coefficient of thermal expansion being higher than said first coefficient of thermal expansion such that when said actuator portion is exposed to sufficient heat, said force fit is eliminated as said valve housing expands at a greater rate than said plug, such that said plug moves away from a position blocking said flow window; and
said valve housing being formed as a distinct part from a component housing, said component housing having an outer surface, wherein said valve housing is mounted in said outer surface of said component housing, and said valve housing extending outwardly away from said outer surface such that said plug and said flow window are on an outer side of said outer surface and said cooling fluid inlet and said cooling fluid outlet are on an opposed side of said outer surface.

2. The system for supplying a cooling fluid as set forth in claim 1, wherein a plunger is spring-biased to move said plug away from the said position blocking said flow window to selectively allow supply of the cooling fluid to the component as said force fit is eliminated due to thermal expansion.

3. The system for supplying a cooling fluid as set forth in claim 2, wherein said plug is formed of a nickel-iron alloy.

4. The system for supplying a cooling fluid as set forth in claim 3, wherein said valve housing is formed of titanium.

5. The system for supplying a cooling fluid as set forth in claim 4, wherein said plug is moved to a position such that it is entirely beyond said fluid window.

6. The system for supplying a cooling fluid as set forth in claim 2, wherein said plug is moved to a position such that it is entirely beyond said flow window.

7. The system for supplying a cooling fluid as set forth in claim 1, wherein said plug is formed of a nickel-iron alloy.

8. The system for supplying a cooling fluid as set forth in claim 6, wherein said valve housing is formed of titanium.

9. A fuel supply system comprising:
a fuel pump configured to supply fuel to a combustor in a gas turbine engine, said fuel pump also delivering fuel to at least one actuator as a hydraulic fluid, and said fuel pump also supplying fuel as a cooling fluid to said actuator, a valve selectively blocking or allowing the cooling fuel to pass to said actuator;

said actuator having an actuator housing, having an outer surface, a cooling fluid valve for selectively providing cooling fluid to said actuator, said cooling fluid valve having an actuator portion extending outwardly beyond said outer surface of said housing; and said cooling fluid valve actuator portion including a plug force fit into an orifice in a valve housing, and said plug blocking flow of cooling fluid from a cooling fluid inlet to a cooling fluid outlet, said cooling fluid outlet being connected to communicate cooling fluid to the actuator, there being a flow window in said valve housing for communicating cooling fluid, and said plug blocking said flow window in a force fit position and said plug being formed of a material having a first coefficient of thermal expansion, and a portion of said valve housing including said orifice receiving said plug being formed of a material having a second coefficient of thermal expansion with said second coefficient of thermal expansion being higher than said first coefficient of thermal expansion such that when said actuator portion of said valve is exposed to sufficient heat, said force fit may be eliminated as said valve housing expands at greater rate than said plug, such that said plug moves away from a position blocking said flow window; and said valve housing being formed as a distinct part from said actuator housing, said actuator housing having an outer surface, wherein said valve housing is mounted in said outer surface of said actuator housing, and said valve housing extending outwardly away from said outer surface such that said plug and said flow window are on an outer side of said outer surface and said cooling fluid inlet and said cooling fluid outlet are on an opposed side of said outer surface.

10. The fuel supply system as set forth in claim 9, wherein a plunger is spring-biased to move said plug away from the said position blocking said flow window to selectively allow supply of the cooling fluid to the component as said force fit is eliminated due to thermal expansion.

11. The fuel supply system as set forth in claim 10, wherein said plug is formed of an invar material.

12. The system for supplying a cooling fluid as set forth in claim 1, wherein said valve housing is received in said component housing with screw threads.

13. The fuel supply system as set forth in claim 9, wherein said valve housing is received in said actuator housing with screw threads.

* * * * *